United States Patent
Ho et al.

[11] Patent Number: 5,954,522
[45] Date of Patent: Sep. 21, 1999

[54] MEMORY CARD CONNECTOR

[75] Inventors: Yu-Ming Ho, Pen-Chiao; Hung-Ji Yu, Taipei Hsien, both of Taiwan

[73] Assignee: Hon Hai Precision Ind. Co., Ltd., Taipei Hsien, Taiwan

[21] Appl. No.: 08/917,642

[22] Filed: Aug. 22, 1997

[30] Foreign Application Priority Data

Oct. 16, 1996 [TW] Taiwan .................................. 85216014

[51] Int. Cl.⁶ ...................................................... H01R 9/09
[52] U.S. Cl. .......................................... 439/79; 439/541.5
[58] Field of Search ........................... 439/79, 81, 541.5, 439/74, 80

[56] References Cited

U.S. PATENT DOCUMENTS

| | | | |
|---|---|---|---|
| 4,639,056 | 1/1987 | Linderman et al. ....................... | 439/79 |
| 5,194,010 | 3/1993 | Dambach et al. ......................... | 439/77 |
| 5,286,207 | 2/1994 | McHugh ............................... | 439/541.5 |
| 5,299,089 | 3/1994 | Lwee ........................................ | 439/172 |
| 5,775,923 | 7/1998 | Tomioka ............................... | 439/541.5 |

*Primary Examiner*—Neil Abrams
*Assistant Examiner*—J. F. Duverne

[57] ABSTRACT

A memory card connector for connection with a first PCB (printed circuit board) and a second PCB provided on the first PCB is disclosed, which comprises an insulating housing including a contact receiving section defining a rear insertion space, and a plurality of conductive contacts received in the contact receiving section, each of the conductive contacts including a front soldering section bending away from the first PCB for soldering onto the second PCB. The memory card connector is provided a grounding plate for shielding and grounding, and ejector mechanism for ejecting a memory card received in the memory card connector. An arrangement of a memory card connector, a mother board and a daughter is disclosed. In addition, a memory card connector assembly including more than one memory card connectors is disclosed as well.

4 Claims, 7 Drawing Sheets

FIG.8

MEMORY CARD CONNECTOR

BACKGROUND OF THE INVENTION

1. Field of the Invention

The invention relates to a memory card connector, particular to a low profile memory card connector.

2. The Prior Art

Figure 1:
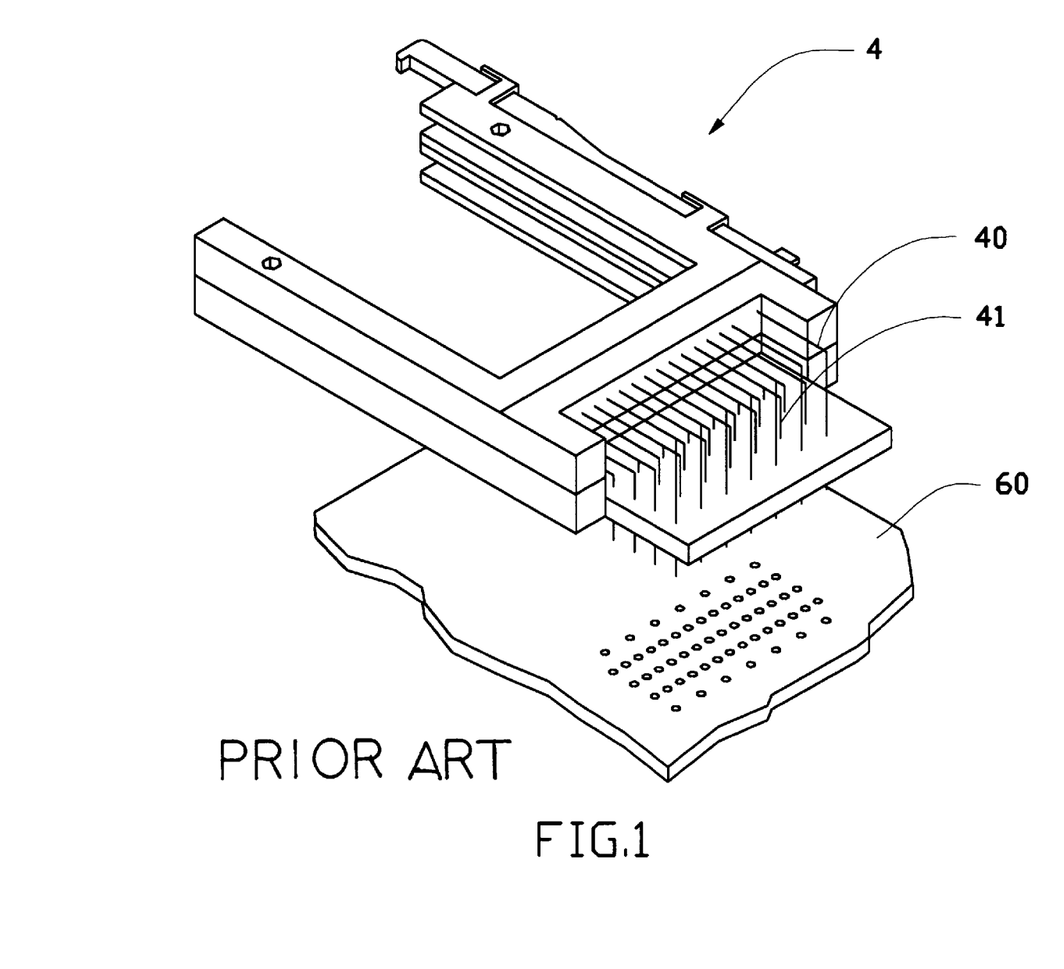
FIG. 1 shows an exploded perspective view of a conventional memory card connector with a mother board.

Memory card connectors are popularly used in the recent computer industry. An earlier conventional memory card connector design is shown in FIG. 1, in which a relatively large space is required for inserting the bent conductive contacts 40, 41 into the mother board 60. A solution is proposed to solve the above-mentioned problem, in which the conductive contacts of the memory card connector are soldered to a horizontal or vertical daughter board and then connected to the mother board. In the arrangement of connecting with a horizontal daughter board, a board-to-board connector is provided on the horizontal daughter board for mounting onto a mating board-to-board connector provided on the mother board. This horizontal arrangement takes up a relatively large space and thus is not suitable for limited area requirement for a portable computer. In the arrangement of connecting with a vertical daughter board, contact pads (so called "gold fingers") are provided on the vertical daughter board for directly inserting into a card edge connector provided on the mother board. In this vertical arrangement, although the width is reduced, the height is increased; in addition, standoff means is provided on the bottom of the memory card connector for meeting the height requirement of the card edge connector. Therefore, in this vertical arrangement, the height is too large to meet the height requirement of a portable computer of a reduced size and the material cost is increased.

A number of above-mentioned memory card connector and the related techniques can be found, for example, in Taiwan Patent Application Nos. 80207449, 81216447, 82205600, 83202199, 83107162, 83208140, and U.S. patent Ser. Nos. 4,818,239, 4,878,856, 4,810,203, 5,085,590, 5,149,276, 5,176,523, 5,286,207, 5,290,174, 5,324,204 and 5,334,046.

Moreover, the conventional memory card connectors are usually mounted on a front surface of the mother board, which involves increased processes to move the components of the mother board associated to the standoffs of the memory card connector to the rear surface of the mother board if there is such need for the memory card connector.

Hence, there is a need for a memory card connector which overcomes the above-mentioned defects of existing memory card connectors.

SUMMARY OF THE INVENTION

Accordingly, one main object of the present invention is to provide a low profile memory card connector with reduced height.

To fulfill the above-mentioned object, according to one embodiment of the present invention, a memory card connector for connection with a first PCB (printed circuit board) and a second PCB provided on the first PCB, comprises an insulating housing including a contact receiving section defining a rear insertion space, and a plurality of conductive contacts received in the contact receiving section, each of the conductive contacts including a front soldering section bending away from the first PCB for soldering onto the second PCB.

In one aspect, the memory card connector according to the present invention further comprises a grounding plate for grounding the memory card inserted in the connector, and ejector mechanism for electing a memory card received in the memory card connector.

In another embodiment, an arrangement of a memory card connector according to the present invention, a first PCB, and a second PCB provided on the first PCB is disclosed. In this arrangement the insulating housing directly abuts at a bottom surface thereof to the first PCB without any standoff means.

In still another embodiment, a memory card connector assembly according to the present invention comprises a mother board, a first daughter board provided on the mother board, a first memory card connector comprising a first insulating housing including a contact receiving section defining a rear insertion space, and a first plurality of conductive contacts received in the contact receiving section, each of the first conductive contacts including a front soldering section bending away from the mother board for soldering onto the first daughter board, and, at least one second memory card connector stacked on a top of the first memory card connector, comprising a second insulating housing and a second plurality of conductive contacts received in the second insulating housing.

These and additional objects, features, and advantages of the present invention will be apparent from a reading of the following detailed description of the embodiments of the invention taken in conjunction with the appended drawing figures, which are described briefly immediately below.

DETAILED DESCRIPTION OF THE PREFERRED EMBODIMENTS

Reference will now be made in detail to the preferred embodiments of the present invention. It will be noted here that for a better understanding, most of like components are designated by like reference numerals throughout the various figures in the embodiments.

Figure 2:
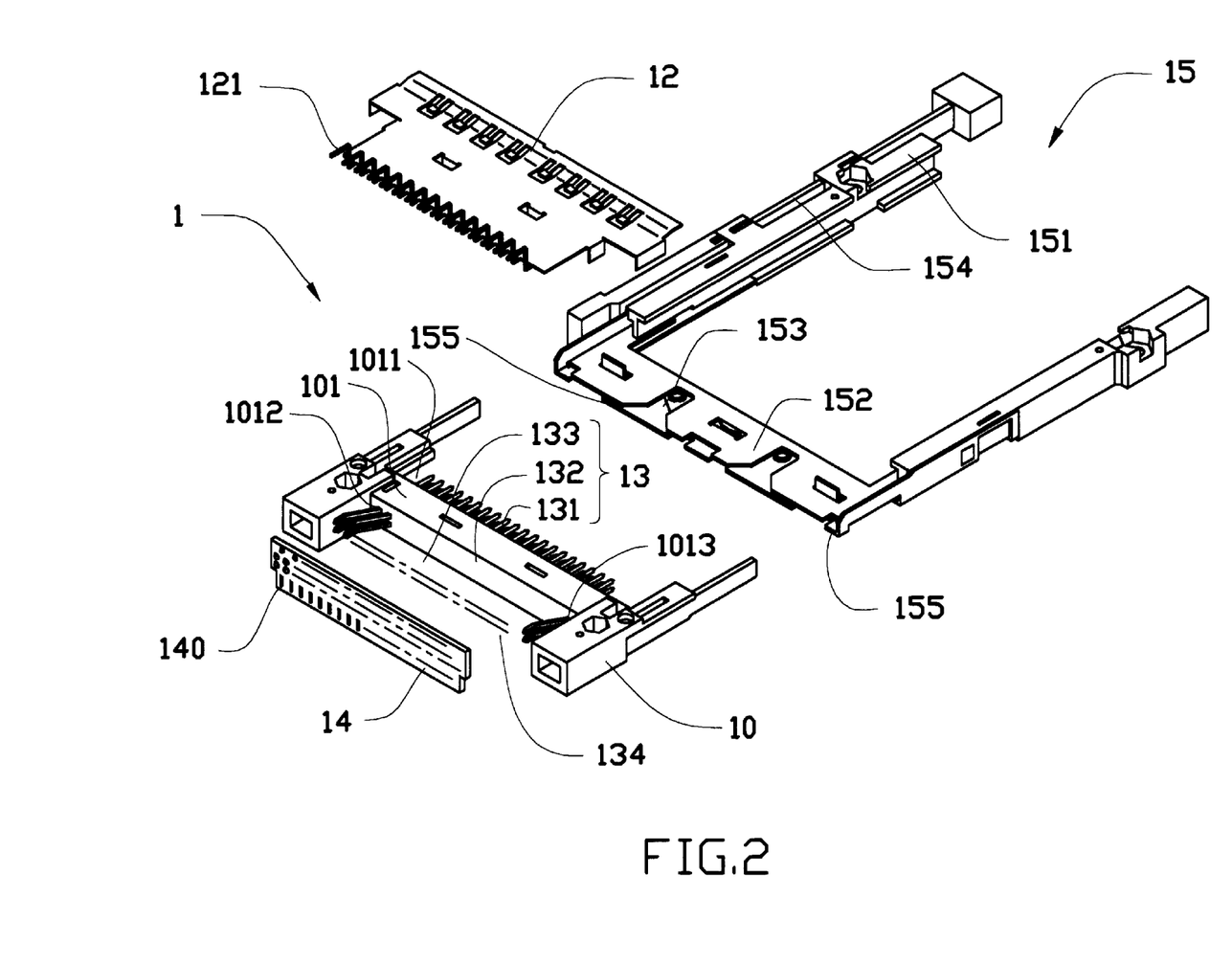
FIG. 2 shows an exploded perspective view of a memory card connector according to a preferred embodiment of the present invention.

Referring now to FIG. 2, there is shown an exploded view of a memory card connector according to the present invention, generally designated at 1. The memory card connector 1 mainly comprises an insulating housing 10, a metal grounding plate 12, a plurality of conductive contacts 13, a daughter board 14, and ejection mechanism 15.

The housing 10 comprises an elongate contact receiving section 101, two arms (not labeled) extending on both lateral ends of the contact receiving section 101 and perpendicular to a lengthwise direction thereof, and defines a rear insertion space 1011 between the two arms and a rear surface of the contact receiving section 101, and a front soldering space 1012 between the two arms and a front surface of the contact receiving section 101. The contact receiving section 101 comprises a plurality of passageways 1013 communicating between the insertion space 1011 and the soldering space 1012 for receiving the contacts 13. The insulating housing 10 further comprises a plurality of positioning protrusions (not shown) on its bottom and a plurality of positioning recesses (not labeled) on its top aligning with the positioning protrusions for matching positioning protrusions of a second memory card connector stacked on a top of the memory card connector 1. In addition, the insulating housing 10 may further comprise screw holes for firmly fastening the stacked memory card connectors together.

The contacts 13 comprises a rear inserting section 131, a middle fixing section 132 and a front soldering section 133. The contacts 13 are received in the contact receiving section 101 of the housing 10 and fixed thereto by the fixing section 132. The front soldering section 133 of the contacts 13 extends forward of the passageways 1013 into the front space 1012 with an upward bending angle relative to the contact receiving section 101. The front soldering section 133 further comprises a horizontal insertion end 135 for inserting into the daughter board 14. The horizontal insertion ends 135 of the contacts 13 extend into a raised transverse space 134 defined in the front space 1012 for receiving the daughter board 14.

The grounding plate 12 substantially shields the whole contact receiving section 101, the rear insertion space 1011 and the front soldering space 1012, providing shielding and grounding effects. A plurality of soldering legs 121 are provided on a front end of the grounding plate 12 for soldering to a plurality of gold fingers 140 of the daughter board 14. The soldering legs 121 of the grounding plate 12 bend first vertically upward and then horizontally relative to the grounding plate 12 so as to meet the upward bending design of the contacts 13.

The ejector mechanism 15 comprises a securing plate 155, an ejecting plate 152, a lever 153, a pushing bar 154, and a pair of guiding posts 151. The guiding posts 151 extend rearward of two lateral ends of the ejecting plate 152 and the pushing bar 154 is slidably retained on one of the guiding posts 151. The ejecting plate 152 movably retains the ejecting plate 151 and pivotably retains the lever 153. The lever 153 is pivotably connected at one end portion thereof to the ejecting plate 152, and is pivotably connected at the other end portion thereof to the pushing bar 154. The ejection mechanism 15 is attached to the housing 10 by inserting the securing plate 155 into the housing 10 from the rear insertion space 1011 and connecting the two arms of the housing 10 with the two guiding posts 151 so that the ejection mechanism 15 can be firmly fixed to the housing 10. With such structure, a memory card (not shown) received in the connector 1 between the guiding posts 151 can be ejected by pushing forward the pushing bar 154 to actuate a rearward movement of the ejecting plate 152 by means of pivoting movement of the lever 153.

Figure 3:
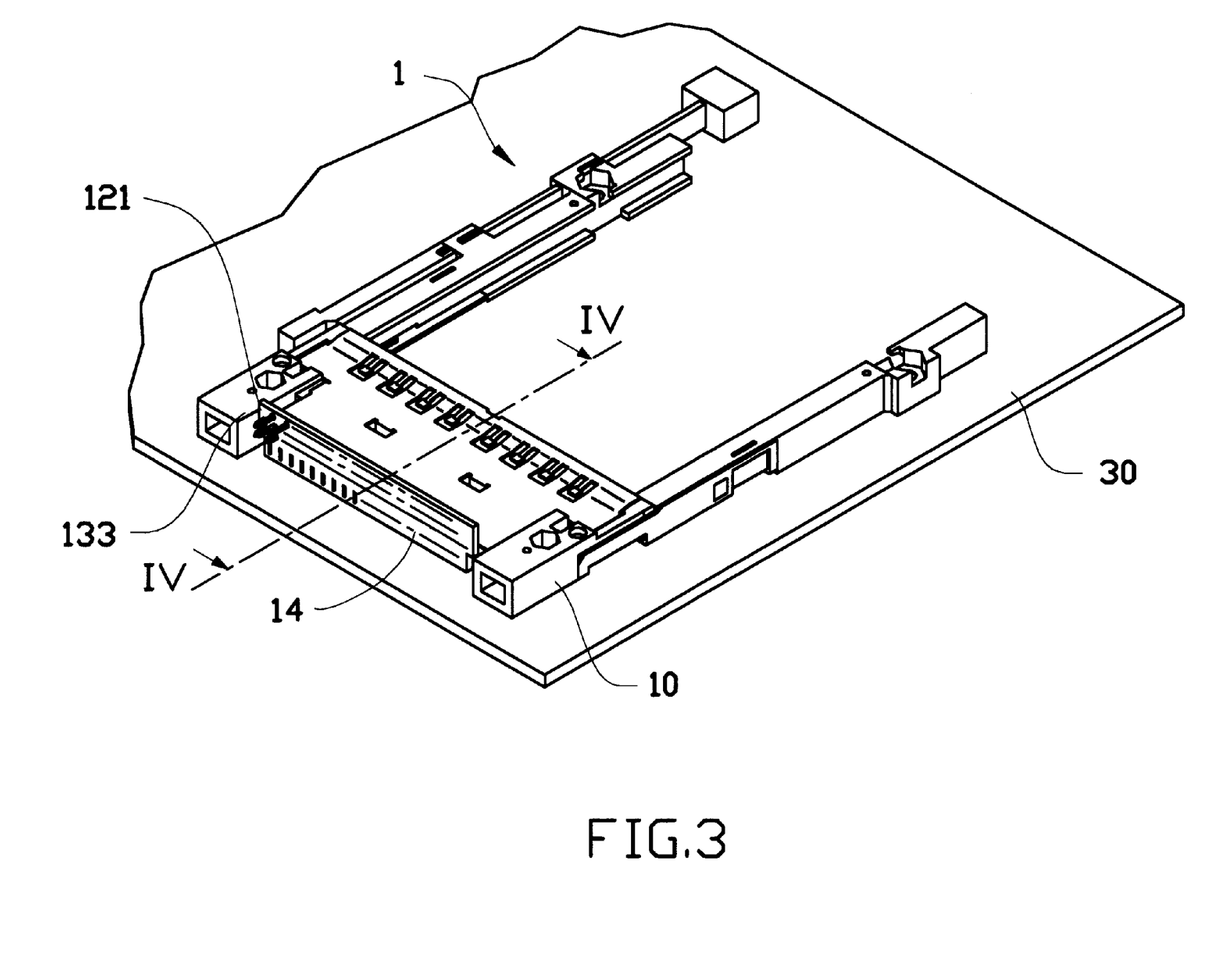
FIG. 3 shows a perspective view of the memory card connector shown in FIG. 2 assembled to a mother board.
Figure 4:
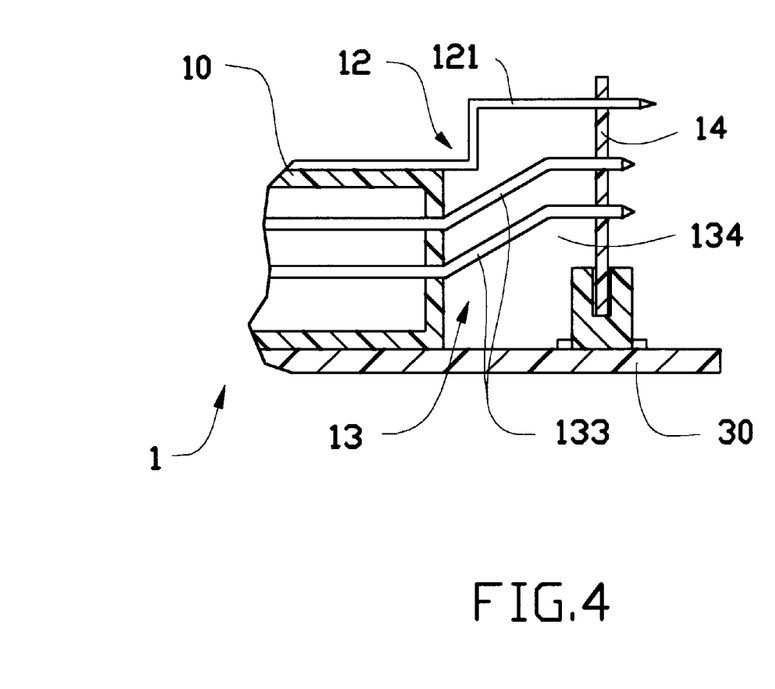
FIG. 4 shows a cross-sectional view of the memory card connector taken along line IV—IV of FIG. 3.

Referring now to FIG. 3, after assembling, the daughter board 14 is vertically soldered on the soldering sections 133 of the contacts 13, and the housing 10 directly abuts at a bottom surface thereof to a mother board 30 without any standoff means (best shown in FIG. 4). As can be seen in FIG. 4, the front soldering section 133 of the contacts 13 extends forward and bends upward with the horizontal insertion end 135 extending into a raised transverse space 134 and inserting into the daughter board 14. Consequently, the memory card connector 1 of a low profile design is reached; the height of the connector 1 is reduced while the connector 1 still keeping well connection with the daughter board 14.

Figure 5:
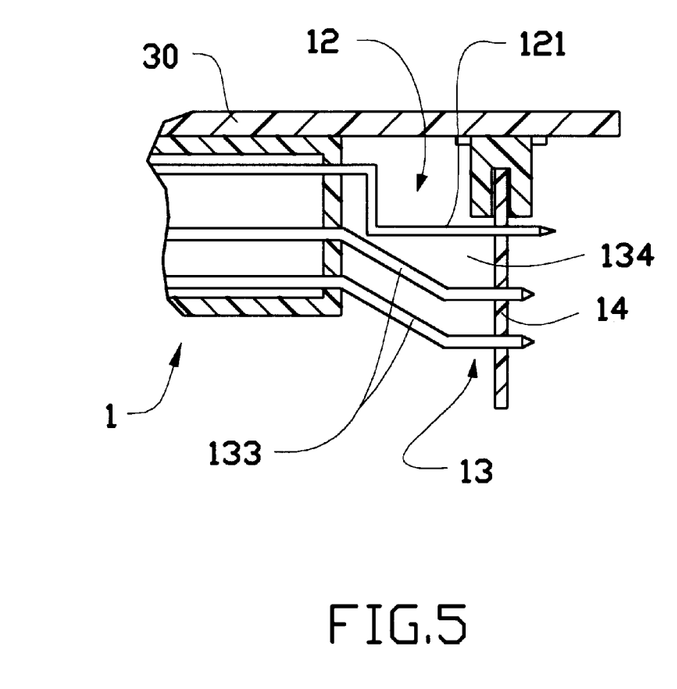
FIG. 5 shows a cross-sectional view of the memory card connector according to another preferred embodiment of the present invention.

In one preferred embodiment, the present memory card connector 1 can be arranged on the rear side of the mother board 30 without many complicated processes to both the connector 1 and the mother board 30, as shown in FIG. 5. In this embodiment, the connector 1 is inverted and the relative positions between the grounding plate 12 and the contacts 13 are rearranged. The only modification to the mother board 30 is to shift the card edge connector for the daughter board 14 of the mother board 30 to the rear side of thereof.

Figure 6:
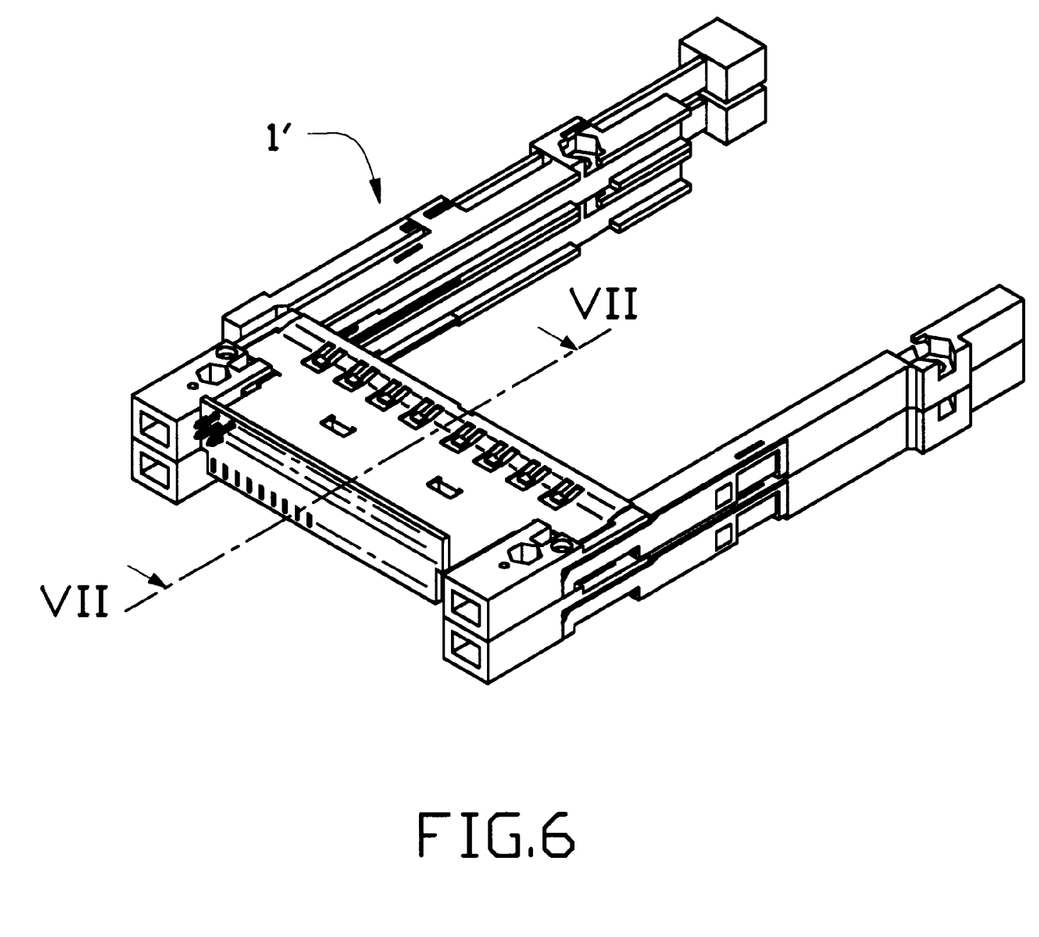
FIG. 6 shows a perspective view of a memory card connector assembly according to the present invention.
Figure 7:
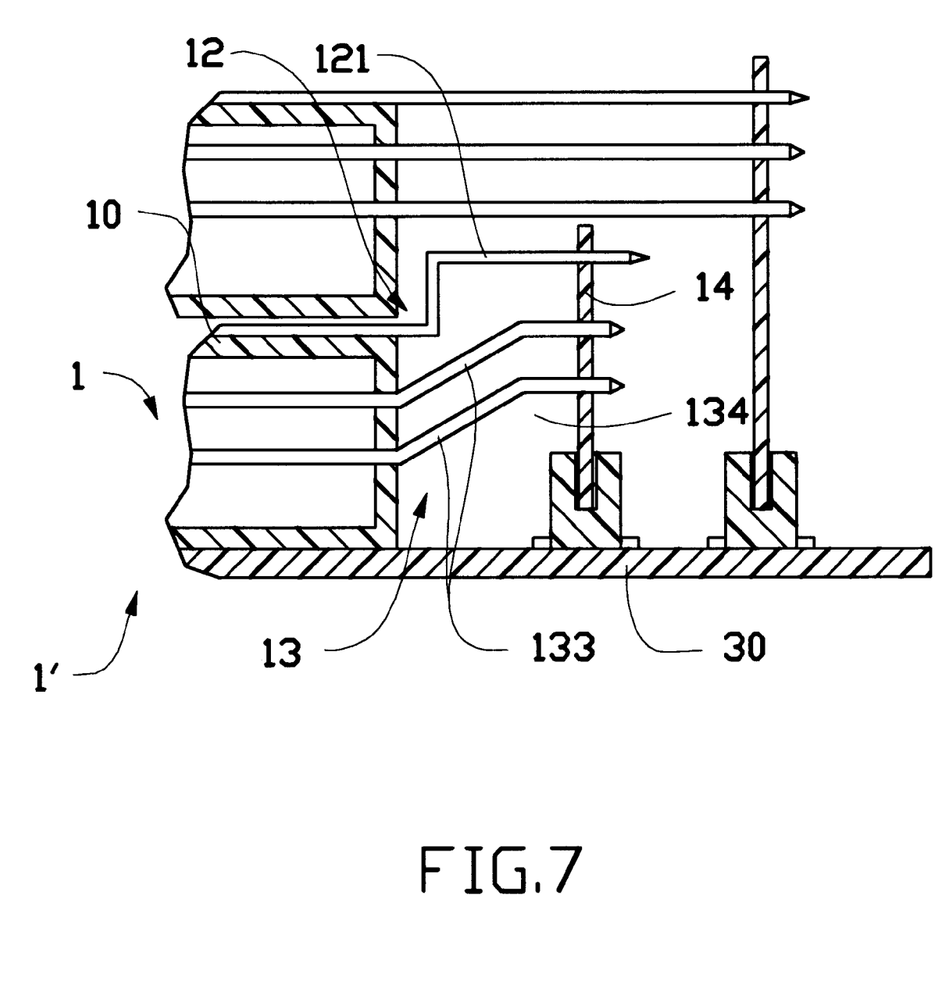
FIG. 7 shows a cross-sectional view of the memory card connector taken along line VII—VII of FIG. 6.

FIGS. 6 and 7 show a memory card connector assembly 1' according to another preferred embodiment of the present invention. In this embodiment, the connector assembly 1' includes a first memory card connector 1 according to the present invention, such as one shown in FIG. 2, provided on the mother board 30 and a second memory card connector stacked on the first memory card connector 1. The second memory card connector comprises conventional straight contacts and straight soldered legs of the grounding plate, and is soldered to a second daughter board provided on the mother board 30 at a front position of the daughter board for the first memory card connector 1. The height of the whole connector assembly 1' is reduced due to the "standoffless" design of the first memory card connector 1.

Figure 8:
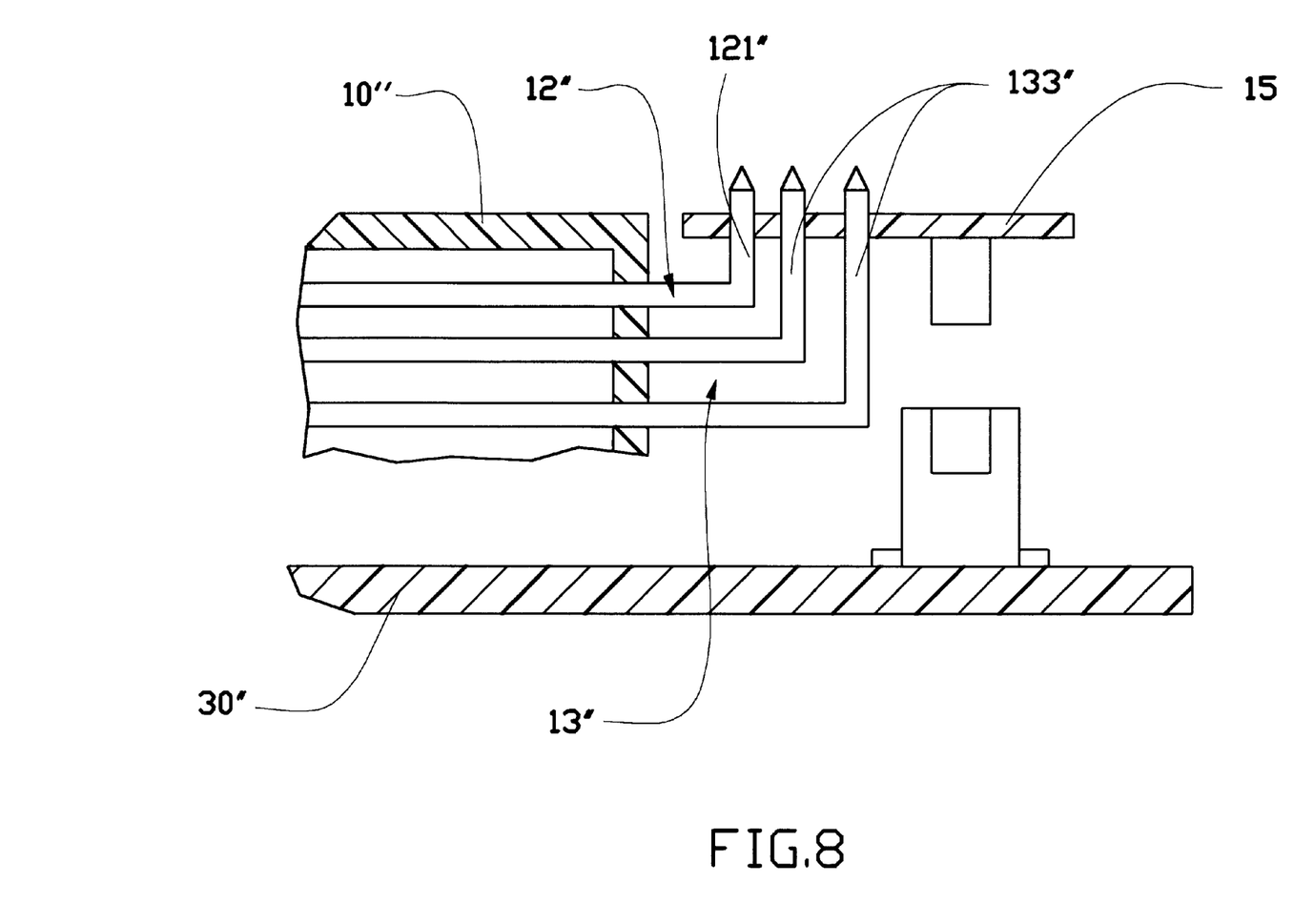
FIG. 8 shows a perspective view of the memory card connector according to a third preferred embodiment of the present invention.

FIG. 8 shows a memory card connector according to another preferred embodiment of the present invention. In this embodiment, all soldering sections 133" of contacts 13" and soldering legs 121" of grounding plate 12" are vertically bent upward for soldering to a horizontal daughter board 15 so as to reduce the height of the memory card connector.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

We claim:

1. An arrangement of a memory card connector, a first PCB, and a second PCB substantially vertically provided on said first PCB, wherein said memory card connector has a planar bottom surface substantially lying against the first PCB and comprises:

an insulating housing including a contact receiving section defining a rear insertion space and a front soldering space;

a plurality of conductive contacts received in said contact receiving section, each conductive contact having a soldering section exposed to the front soldering space and upwardly bent with respect to the contact receiving section of the insulating housing for being inserted vertically to the second PCB; and a grounding plate including a plurality of soldering legs provided on a first end thereof, each of said soldering legs bending away from said first PCB for soldering vertically onto said second PCB.

2. The arrangement of a memory card connector as claimed in claim 1, wherein said soldering legs first bend away from said first PCB at a right angle and then bend horizontally to solder onto said second PCB.

3. The arrangement of a memory card connector as claimed in claim 2, wherein said insulating housing directly abuts at a bottom surface thereof to the first PCB without any standoff means.

4. An electrical connector assembly comprising:

a memory card connector mounted on a mother board;

a card edge connector spaced from the memory card connector and mounted on the same mother board;

a daughter board received within said card edge connector and perpendicular to said mother board;

said memory card connector including an insulative housing enclosing a plurality conductive contacts therein, each of said contacts including a soldering section solderably extending through said daughter board, wherein the soldering section bends away from the mother board, thereby requiring no standoffs of the memory card connector.

* * * * *